Patented Apr. 26, 1949

2,468,352

UNITED STATES PATENT OFFICE 2,468,352

SYNTHESIS OF CYANO ACYLAMINO TRICARBOXYLATE COMPOUNDS AND PRODUCTS

Donald T. Warner and Owen A. Moe, Minneapolis, Minn., assignors to General Mills, Inc., a corporation of Delaware No Drawing. Application June 19, 1947, Serial No. 755,708

6 Claims. (Cl. 260—465.4)

The present invention relates to the synthesis of cyanoacylaminotricarboxylate compounds and products which have novel properties and which are useful as intermediates for further syntheses, particularly for the production of pimelic and substituted pimelic acids.

It is therefore, an object of the present invention to provide novel cyanotricarboxylate compounds having novel properties and which are useful in further syntheses, particularly for the synthesis of pimelic and substituted pimelic acids.

It is a further object of the present invention to provide a process of preparing such compounds.

The cyanotricarboxylate compounds of the present invention have the following formula:

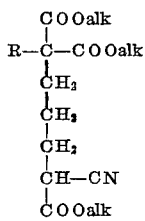

where alk represents an alkyl group, and R may be H, alkyl, or substituted amino.

These compounds can be readily hydrolyzed to tetracarboxylic acids which can be decarboxylated to pimelic acids and substituted pimelic acids.

These cyanotricarboxylate compounds may be prepared by the condensation-reduction reaction of cyanoacetic ester and gamma,gamma-dicarbalkoxy butyraldehyde or with gamma,gamma-dicarbalkoxy-gamma-substituted butyraldehyde.

The gamma,gamma-dicarbalkoxy butyraldehyde employed in this condensation may be prepared as disclosed in our copending application, Serial No. 648,020, filed February 15, 1946, entitled Aldehydo compounds and processes of producing the same, now abandoned. According to that application these aldehydo compounds may be prepared in several ways. One of such methods involves the condensation of malonic ester or a substituted malonic ester with acrolein, which results in the direct production of the desired aldehyde. In the use of unsubstituted malonic ester in this condensation, it is found that the acrolein may react with both of the hydrogens on the methylene group and result in a di-substitution product in addition to the desired butyraldehyde. In such instances, however, the two products can be readily separated by distillation. Where a substituted malonic ester is employed, only one hydrogen is available, and accordingly only a single reaction product is obtained.

The condensation-reduction of the present invention may be illustrated by the following reaction of gamma, gamma-dicarbethoxy butyraldehyde and ethyl cyanoacetate, and the subsequent conversion of cyanotricarboxylate to pimelic acid:

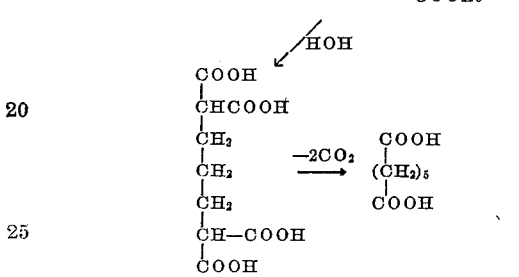

The condensation-reduction may be carried out in the presence of a suitable solvent such as ethanol, dioxane, and the like, in the presence of a conventional hydrogenation catalyst, and under hydrogen pressure. When the reduction is complete, the reaction mixture may be filtered and the filtrate concentrated in vacuo. Thereafter the residual oil may be dissolved in benzene and washed with water. The benzene may then be removed by distillation, after which the residue may be purified by distillation under reduced pressure. The cyanotricarboxylate compound thus obtained may be hydrolyzed in alkaline media to the corresponding tetracarboxylic acid, which may then be isolated. These tetracarboxylic acids may then be decarboxylated by heating them above the melting point. The cyanotricarboxylate compounds may be hydrolyzed directly to the pimelic acids in acidic media.

The following examples will serve to illustrate the invention:

Example 1

200 parts of absolute ethyl alcohol were treated with 0.10 part of metallic sodium. When the reaction of the sodium was complete, 87.4 parts of ethyl acetamidomalonate were added. The resultant reaction mixture was a thick slurry, and it was cooled to 3° C. in an ice bath. Then 25.8 parts of acrolein were introduced dropwise. After the addition of approximately 8 parts of the acrolein, the reaction temperature had increased to 13° C. The introduction of the acrolein was interrupted, and the reaction temperature decreased to 8° C. The remainder of the acrolein was added at a rate such that the reaction temperature was maintained at 8-10° C. After the addition of the acrolein was complete, the reaction mixture was stirred for an additional 30-minute period. The solution was clear and light brown in color. During the addition of the acrolein, the solid initially present had disappeared. This reaction appeared to proceed in an extremely smooth fashion. The clear, light-colored solution was cooled in an ice bath for an additional hour when the catalyst was neutralized by the addition of 3 parts of glacial acetic acid dissolved in a small amount of ethanol. The pH of the reaction mixture at this point was between 4 and 6. The resulting mixture was placed in an ice box overnight. After standing overnight the solution was filtered and the solvent was removed by evaporation in vacuo. The residual oil (gamma - acetamido - gamma, gamma - dicarbethoxy butyraldehyde) was very clear and possessed a light yellow-brown color.

Eighty-four and seven-tenths grams of gamma-acetamido-gamma, gamma-dicarbethoxy butyraldehyde prepared in the above fashion were dissolved in 100 ml. of ethyl alcohol. To this solution 36.2 g. of ethyl cyanoacetate and 4.0 g. of glacial acetic acid were added. After cooling, 1.2 g. of piperidine and 2.3 g. of 5% palladium on charcoal were added. The reduction step was carried out at 40-50 pounds hydrogen pressure. After the reduction was complete the product was worked up as previously described. Distillation under diminished pressure yielded the desired product which was collected at 210-220° C. at 0.8 mm. $n_D^{25}$ 1.4666. Redistillation yielded the desired product which was collected at 195-198° C. at 0.25 mm. $n_D^{25}$ 1.4661.

Five and two-tenths grams of the redistilled product were mixed with 50 ml. concentrated hydrochloric acid and the resulting reaction mixture was refluxed for a 24-hour period. After cooling, the reaction mixture was filtered and the filtrate was concentrated in vacuo. The residue was dissolved in 8 cc. of water and the aqueous solution was neutralized to pH 3.1 with sodium hydroxide solution. The resulting solution was heated and filtered. When the filtrate was permitted to cool it yielded a crystalline product which was collected by filtration. This crude alpha-amino-pimelic acid melted at 210° C. with decomposition. After purification by recrystallization from water it melted at 216° C. with decomposition. The alpha-amino-pimelic acid was further characterized as the N-benzoyl derivative which melted at 164-165° C. after purification.

*Example 2*

A solution containing 21.6 g. of gamma, gamma-dicarbethoxy butyraldehyde in 50 ml. of anhydrous dioxane was mixed with 11.3 g. of ethyl cyanoacetate and 1.2 g. of glacial acetic acid. The reaction mixture was cooled to 4° C. and then 0.35 g. of piperidine dissolved in a small amount of ethanol was added. It was noted that the temperature of the reaction mixture increased somewhat. Then 0.4 g. of 5% palladium on charcoal was added and the reduction was started at once at a hydrogen pressure of 32 pounds. When the reduction appeared to be complete the catalyst was removed by filtration and the solvent was removed in vacuo. The residual oil was dissolved in benzene and the benzene solution was extracted with water containing approximately 10% of sodium chloride. The benzene solution was dried over sodium sulfate, and after filtering, the benzene was removed in vacuo. The residue was distilled under diminished pressure and a small amount of forerun was discarded. The main fraction was collected at 156-160° C. at 0.12-0.15 mm. and $n_D^{25}$ 1.4485, and a second fraction was collected at 160-164° C. at 0.12-0.20 mm. and $n_D^{25}$ 1.4482. These two fractions were combined and subjected to redistillation. The desired fraction was collected at 141-143° C. at 0.06 mm. and $n_D^{25}$ 1.4474.

Three and nine-tenths grams of the redistilled product were mixed with 47 g. of 50 volume percent sulfuric acid. The resulting reaction mixture was refluxed for a period of 9 hours. After cooling, the reaction mixture was extracted with ether and the ether extracts were combined and dried. After drying, the ether was removed in vacuo and the white residual solid was dissolved in hot benzene. The benzene solution was permitted to cool slowly and the crystalline product thus obtained proved to be pimelic acid and melted at 103-104° C. Pimelic acid was further characterized as the p-bromphenacyl ester and the dianilide which melted at 136-137° C. respectively after purification.

*Example 3*

24.4 g. of gamma-ethyl-gamma,gamma-dicarbethoxy butyraldehyde (gamma,gamma-dicarbethoxy caproaldehyde) were dissolved in 50 ml. of absolute ethanol and 12.5 g. of ethyl cyanoacetate and 1.2 g. of glacial acetic acid were added. The resulting reaction mixture was cooled to 8° C. when 0.4 g. of piperidine was added with shaking over a 5-minute period. Then 1.2 g. of 5% palladium on charcoal was added and the hydrogenation was started at 40-50 pounds hydrogen pressure. The reduction was substantially complete after a 3-hour period. The catalyst was removed by filtration and the filtrate was concentrated in vacuo. The residue was dissolved in benzene and treated as previously described. Distillation of the reaction product under diminished pressure yielded three fractions. The first fraction was discarded and the second (main) fraction was collected at 156-163° C. at 0.12 mm. $n_D^{25}$ 1.4489. The third fraction was collected at 163-177° C. at 0.15-0.25 mm. $n_D^{25}$ 1.4520. The last two fractions were combined and subjected to redistillation under diminished pressure and the desired fraction was collected at 145-147° C. at 0.07 mm. $n_D^{25}$ 1.4482.

Five and four-tenths gram of the redistilled product were mixed with 25 ml. of sodium hydroxide solution (4.1 g. sodium hydroxide). The evolution of ammonia had ceased after a refluxing period of 44 hours. The reaction mixture was cooled, filtered and acidified with hydrochloric acid. The precipitated inorganic salts were removed by filtration. The filtrate was concentrated in vacuo to yield a residual oil which solidified. The crude product thus obtained melted at 168-173° C. with decomposition. When this tetracarboxylic acid was recrystallized from benzene in ether mixture it melted at 170-171° C. with decomposition (neutral equivalent calculated at 69.0, found 70.5).

One and one-tenth gram of the above tetracarboxylic acid was decarboxylated at 190° C. When the evolution of carbon dioxide had ceased the resulting alpha-ethyl pimelic acid weighed 0.74 g. The alpha-ethyl pimelic acid was characterized as the dianilide which melted at 160–161° C. after purification.

*Example 4*

160 parts of absolute ethanol were reacted with 0.1 part of metallic sodium. When the sodium had reacted, 114.1 parts of diethyl decylmalonate were added and the solution was cooled to 0° C. To the cold solution, 23.5 parts of acrolein were added at such a rate that the temperature remained between 0° and +5° C. The reaction mixture was cooled at +3° C. for an additional 60 hours. The catalyst was then neutralized by the addition of one part of glacial acetic acid, and the reaction mixture was concentrated in vacuo on a water bath. The residual oil was dissolved in benzene, and the solution extracted with water, after which the benzene solution was dried over anhydrous sodium sulfate. After filtering the sodium sulfate, the benzene was removed by evaporation in vacuo. The residual oil was subjected to distillation at approximately 0.5 mm. to remove the excess diethyl decylmalonate. The crude aldehyde compound was obtained as a residue weighing 99.0 parts, $n_D^{25}$ 1.4542.

51.9 parts of crude aldehydo compound (gamma-decyl-gamma,gamma-dicarbethoxy butyraldehyde) were dissolved in 40 parts of 95% ethanol. 1.5 parts of glacial acetic acid and 20.3 parts of ethyl cyanoacetate were added. The solution was cooled to 8° C. and 0.5 part of piperidine were added in small portions. When the addition was complete, 1.4 parts of 5% palladium on charcoal were introduced; and the mixture was hydrogenated at an initial pressure of 37 pounds of hydrogen. Approximately 75% of the theoretical hydrogen was absorbed in a 20-hour period. The catalyst was removed by filtration and the filtrate was concentrated to a syrup. This syrup was dissolved in ether, and the solution was extracted with a 5% sodium chloride solution. The ether layer was dried over anhydrous sodium sulfate, filtered, and the ether was removed by evaporation on a steam bath. The residue was subjected to distillation at 0.7 mm. The main fraction boiled at 205–218°/0.7 mm., $n_D^{25}$ 1.4534. Redistillation yielded purified ethyl-alpha-cyano-epsilon, epsilon-dicarbethoxy hexadecanoate, B. P.=184–187° C./0.08 mm., $n_D^{25}$ 1.4531.

Numerous variations are, of course, possible in the conditions for the condensation-reduction. Thus any conventional hydrogenation catalyst such as platinum, palladium, Raney nickel, and the like, may be used. Hydrogen pressures are capable of considerable variations, but in general, pressures between 1 and 5 atmospheres are suitable. Likewise temperature conditions may be varied and in general a temperature range from 20–50° C. is desirable. The time periods likewise vary depending upon the compounds being treated, catalyst employed, solvent used, and the like. In general, it will be found that a time period of 2–40 hours is suitable. In general the hydrogenation proceeds more rapidly in the presence of ethanol as a solvent than it does in the presence of dioxane. Likewise the time period is shorter where R is hydrogen or a low alkyl group than it is where R is a long chain aliphatic group. It will be apparent that other variations in the process are possible without departing from the spirit of the invention.

While various modifications of the above invention have been described, it is to be understood that the same is not limited thereto, but may be varied within the scope of the following claims.

We claim as our invention:

1. Cyanotricarboxylate compounds having the formula:

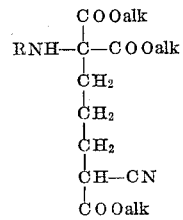

where alk represents an alkyl group and R is acyl.

2. Cyanotricarboxylate compounds having the formula:

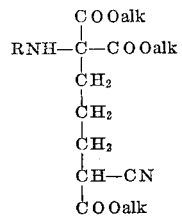

where alk represents a lower alkyl group and R is acyl.

3. Cyanotricarboxylate compounds having the formula:

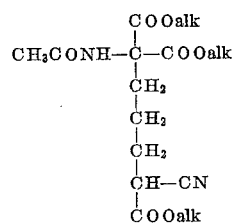

where alk represents an alkyl group.

4. Process of preparing cyanotricarboxylate compounds having the formula:

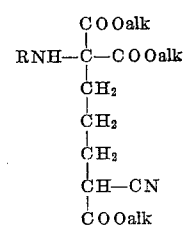

where alk represents an alkyl group and R is acyl, which comprises condensing an aldehyde having the formula:

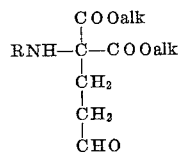

with an alkyl ester of cyanoacetic acid, and reducing the condensation product thus obtained.

5. Process of preparing cyanotricarboxylate compounds having the formula:

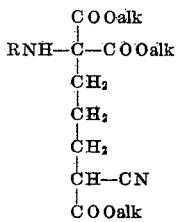

where alk represents an alkyl group and R is acyl, which comprises condensing an aldehyde having the formula:

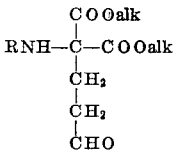

with an alkyl ester of cyanoacetic acid, and contacting the reaction mixture with hydrogen under pressure in the presence of a hydrogenation catalyst to reduce the condensation product to the cyanotricarboxylate compound.

6. Process of preparing cyanotricarboxylate compounds having the formula:

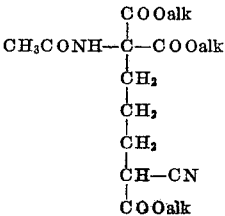

where alk represents an alkyl group, which comprises condensing gamma,gamma-dicarbalkoxy-gamma-acetamido butyraldehyde with an alkyl ester of cyanoacetic acid, and catalytically reducing the condensation product thus attained.

DONALD T. WARNER.
OWEN A. MOE.

REFERENCES CITED

The following references are of record in the file of this patent:

UNITED STATES PATENTS

| Number | Name | Date |
|---|---|---|
| 1,891,055 | Reppe et al. | Dec. 13, 1932 |
| 2,093,519 | Hamann | Sept. 21, 1937 |
| 2,150,154 | Cope | Mar. 14, 1939 |
| 2,334,140 | Winaus | Nov. 9, 1943 |

OTHER REFERENCES

Best et al.: J. Chem. Soc. (London), vol. 95, p. 696 (1909).

Best et al.: Beilstein (Handbuch), vol. III, p. 863 (1921) 4th ed.

Kuster et al.: Chem. Absts., vol. 18, p. 1817 (1924).

Bloom et al.: J. Chem. Soc. (London), vol. 1931, pp. 2771-2772.

Uschakow: Beilstein (Handbuch), 4th ed., vol. II, 2nd suppl., p. 704 (1942).

Pfeiffer et al.: Beilstein (Handbuch), vol. II, 2nd suppl., p. 705 (1942).

Karrer et al.: Chem. Absts., vol. 38, p. 4942 (1944).